United States Patent [19]
Okabe et al.

[11] 3,906,226
[45] Sept. 16, 1975

[54] NITRIC OXIDE POLLUTION MONITOR

[75] Inventors: Hideo Okabe, Rockville; Frederick P. Schwarz, Mount Airy, both of Md.

[73] Assignee: The United States of America as represented by the Secretary of Commerce, Washington, D.C.

[22] Filed: Mar. 29, 1974

[21] Appl. No.: 456,342

[52] U.S. Cl. .............. 250/304; 250/252; 250/373
[51] Int. Cl.² ................................. G01J 1/42
[58] Field of Search .......... 250/372, 373, 461, 364, 250/304, 252

[56] References Cited
UNITED STATES PATENTS

| | | | |
|---|---|---|---|
| 3,151,204 | 9/1964 | Stacy | 250/364 |
| 3,507,987 | 4/1970 | Denbosch | 250/372 |
| 3,795,812 | 3/1974 | Okabe | 250/373 |
| 3,826,920 | 7/1974 | Woodroffe et al. | 250/373 |
| 3,829,696 | 8/1974 | Birnbaum | 250/373 |

*Primary Examiner*—Harold A. Dixon
*Attorney, Agent, or Firm*—David Robbins; Alvin J. Englert

[57] ABSTRACT

A monitor for NO in a gas stream which comprises a flow-type fluorescence cell, means for flowing a sample stream through the cell, means for irradiating the sample stream with ultraviolet light to cause fluorescence of NO, and means for measuring the fluorescence intensity of NO in the sample stream.

1 Claim, 5 Drawing Figures

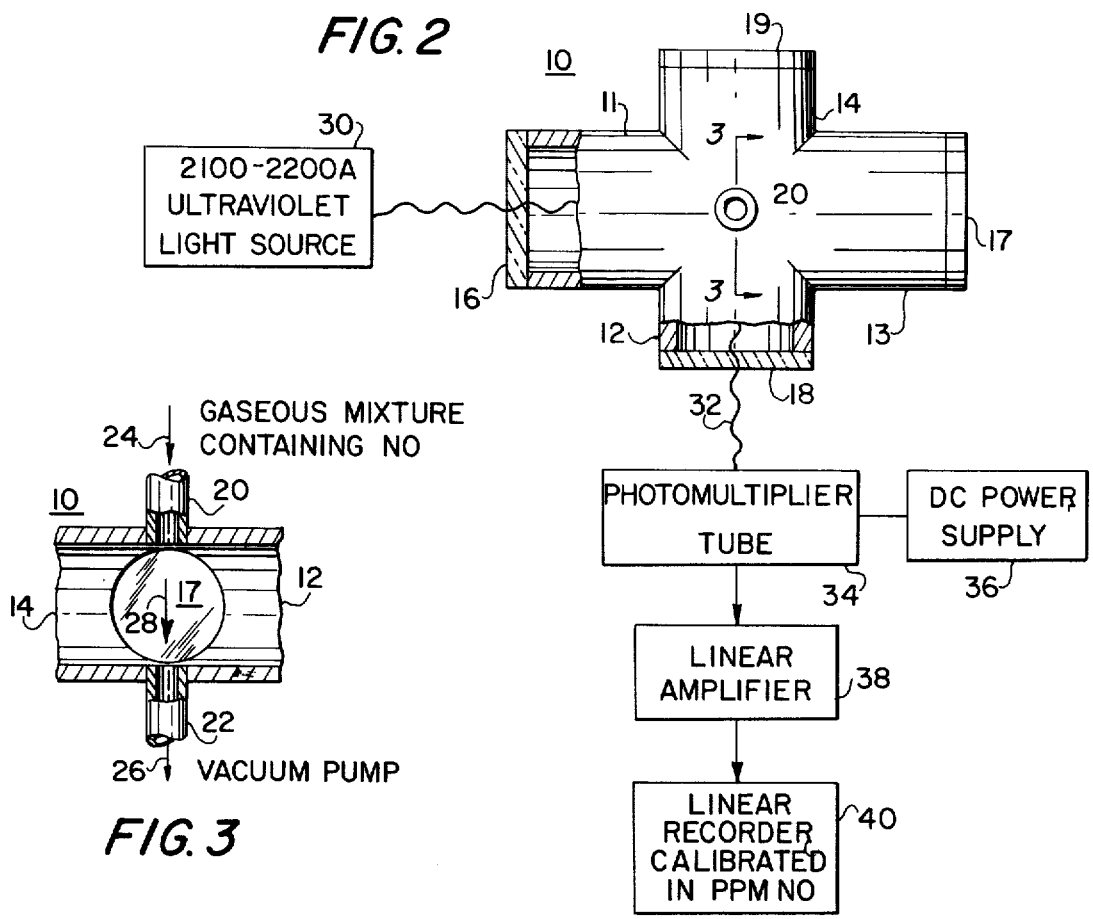
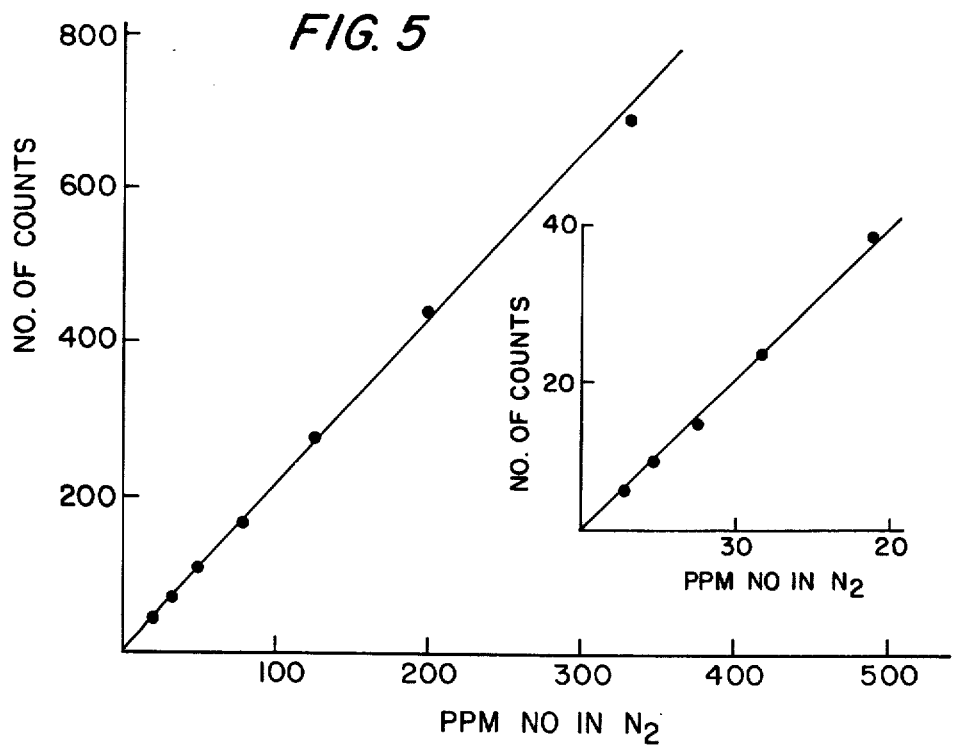

NITRIC OXIDE POLLUTION MONITOR

REFERENCE TO RELATED APPLICATION

Reference is made to a related application, "Sulfur Dioxide Pollution Monitor," by Hideo Okabe, now U.S. Pat. No. 3,795,812, issued Mar. 5, 1974.

BACKGROUND OF THE INVENTION

Millions of tons of nitric oxide are currently released into the air each year by the burning of coal and oil, and from automobile exhausts. Although NO itself is considered only moderately toxic, it slowly changes to much more hazardous $NO_2$ in the atmosphere. It is well known that a long exposure to even less than a part per million (ppm) $NO_2$ in air causes respiratory illness and that the interactions of $NO_2$, hydrocarbons and sunlight produce photochemical oxidants. It is therefore necessary to limit the emission of NO.

Prior techniques for monitoring NO have generally been based on a chemiluminescent reaction, in which ozone is generated and reacted with NO to produce fluorescing nitrogen dioxide molecules. The reaction is usually carried out in a flow system, designed so that the reaction between NO and ozone takes place in a partially-evacuated cell arranged so that fluorescence of activated nitrogen dioxide molecules can be measured by a photomultiplier. The intensity of the fluorescence is proportional to NO concentration down to the range of parts per billion (ppb). See, generally, A. Fontijn et al., *Analytical Chemistry*, Volume 42 (1970), at 575.

It will be apparent that, notwithstanding the high reliability and accuracy of methods for monitoring NO concentration by conversion to fluorescent nitrogen dioxide, the necessity of producing ozone to react with NO in a partially evacuated vessel increases the complexity and cost of systems based on the measurement of fluorescent nitrogen dioxide. Thus, there exists a continuing need for methods and devices for monitoring NO which are simpler and more economical than hitherto known methods and devices.

SUMMARY OF THE INVENTION

It has been found, according to this invention, that irradiation of NO by ultraviolet light in the region from about 2,100 to about 2,300 A produces excited NO, the fluorescence of which is measured in the 2,200 to 3,200 A region and is proportional to the NO concentration in a gas stream, whether the gas stream is NO in nitrogen, air, stack gas or automobile exhaust gas. It has further been found that the method of this invention is applicable to the quantitative determination of NO in gas streams containing water, carbon monoxide, carbon dioxide, oxygen, ethylene, propane, hydrogen, sulfur dioxide and the like provided their concentration does not fluctuate widely.

BRIEF DESCRIPTION OF THE DRAWINGS

FIG. 2 is a top plan view, partly sectioned and partly of a detailed view of a typical NO monitor constructed in accordance with the principles of this invention.

FIG. 3 is a sectional view taken on line 3—3 of FIG. 2.

FIG. 5 is a diagram of the response of the monitor as a function of NO concentration in a static system, the excitation being provided by a zinc vapor lamp emitting at 2,138 A.

Figure 1:
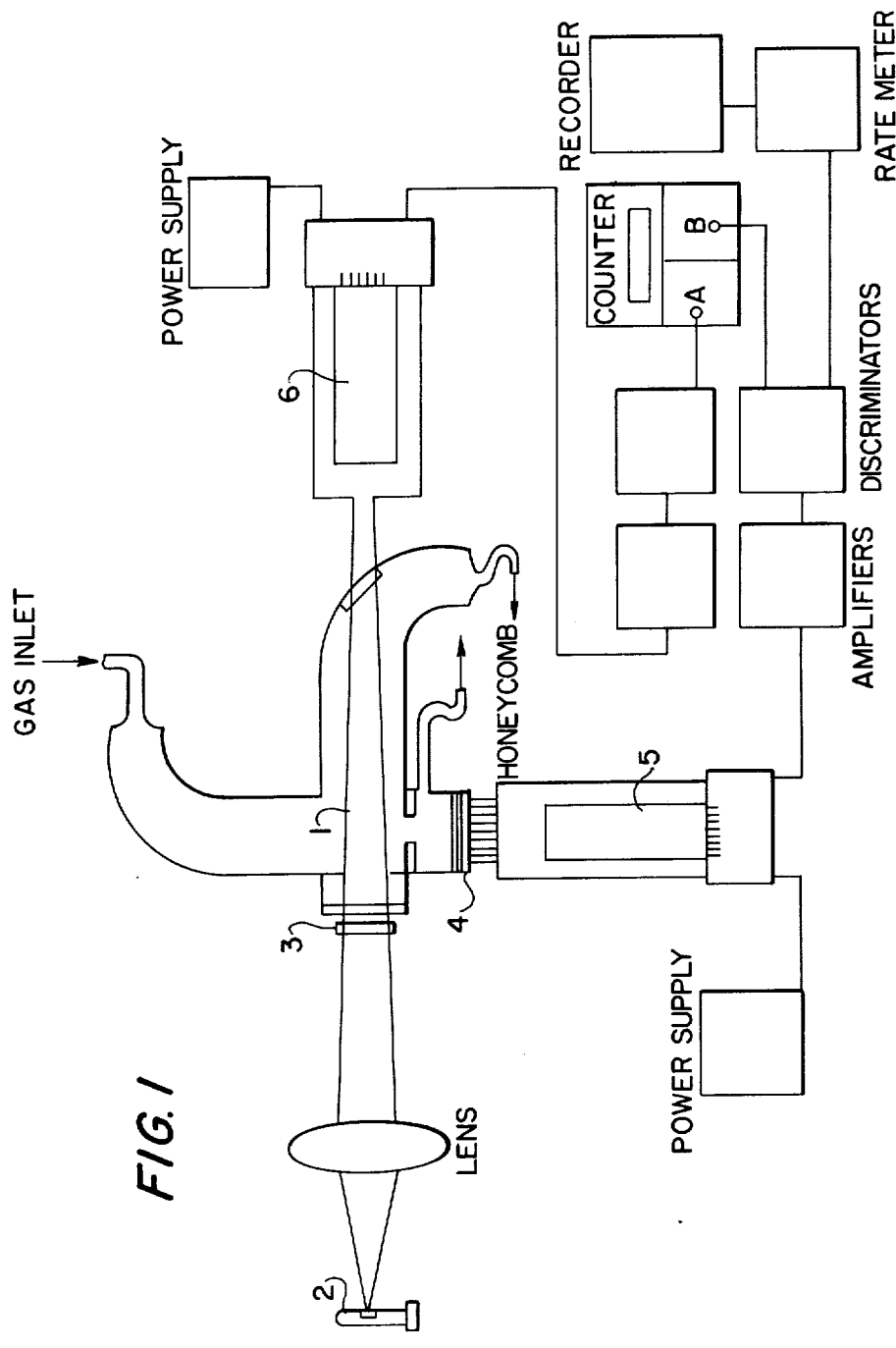
FIG. 1 is a schematic diagram of the NO monitoring system of this invention.

The NO polution monitor of this invention comprise:
 a flow-type fluorescence cell;
 means for flowing a sample stream of air, smokestack gas, automobile exhaust gas and the like of which the NO concentration is to be monitored through the cell;
 means for irradiating the sample stream in said cell with a beam of ultraviolet light in the region from about 2,100 to about 2,300 A, whereby NO is said sample stream fluoresces in the region from about 2,200 to about 3,200 A with an intensity which varies substantially linearly with respect to NO concentration over a wide range of values; and
 means, placed at right angles to the means for irradiating said sample stream and calibrated linearly in terms of NO concentration over the wide range, for measuring fluorescence intensity of NO in said sample stream.

Preferably, the NO sample stream thus activated fluoresces in the region from about 2,200 to about 3,200 A with an intensity which varies nearly linearly with NO concentration from about 0.04 ppm to about 10 ppm and sublinearly up to 300 ppm. The means for measuring fluorescence intensity of NO in said sample stream is nearly linearly calibrated in terms of NO concentration from about 0.04 to about 300 ppm.

In a preferred embodiment of the NO monitor, the means for irradiating the sample stream comprises a zinc vapor discharge lamp operating on alternating current and means for focussing an image of the discharge thereof in said sample stream in said cell. Most preferably, the combination of zinc lamp and focussing means has disposed between the lamp and the fluorescence cell a filter means which transmits wavelengths in the region below about 2,500 A and for rejecting longer wavelengths.

In another preferred embodiment of the NO monitor of this invention, there is disposed between the fluorescence cell and the means for measuring fluorescent intensity a filter means which transmits wavelengths in the region from about 2,200 to about 3,200 A and rejects substantially all other wavelengths.

Commonly, and preferably, the NO monitor of this invention has as means for measuring fluorescence intensity a photomultiplier tube operatively connected to a recorder or counter.

When the gas stream in which NO is being measured is automobile exhaust gas or a source containing NO fluorescence quenchers, the NO monitor preferably includes means for diluting the gas stream with nitrogen prior to entry into the flow-type fluorescence cell.

Fluorescence intensity of activated NO is proportional to the product of NO concentration multiplied by the incident light intensity. Photon counts of both the fluorescence intensity and incident light intensity are converted into a ratio which is proportional only to the NO concentration in a gas mixture.

Measurements of NO in a gas stream are done in a vacuum system. Thus, in evaluating the principles of this invention in a static system, the fluorescence cell was connected to a vacuum manifold and gas-mixing vessel. Nitrogen containing 250 ppm of NO was prepared and then successively diluted with nitrogen in the mixing vessel to yield lower concentrations. The total pressure of the mixtures was 760 torr. Similar measurements were done in a flow system wherein 300 ppm of NO in nitrogen as a slowly flowing stream was mixed with a fast-flowing stream of nitrogen. The NO concentration is determined from the relative flow rates. When an air sample is being monitored for NO content, pure dry air was used as the diluent.

In the measurement of the NO concentrations in air or in $N_2$ the integrated background counts, $C_B$, was taken during the flow of air or $N_2$ through the cell. Then the sample was introduced into the cell and the integrated counts, $C_{NO} + C_B$, were recorded. The integrated counts were taken over a period of 25 seconds for the NO in $N_2$ measurements and a period of 1 minute for the NO in air. The difference gives the concentration of NO $$(C_{NO} + C_B) - C_B(\text{average}) = C_{NO}.$$

The NO fluorescence intensity over an interval of time, $\Delta t_{int}$, is $C_{NO}$ and, neglecting self-absorption and self quenching, $$C_{NO} = S\phi I_{abs}\Delta t_{int}$$

where $S$ is an instrumental factor, $\phi$ is the quantum efficiency of emission from the $A^2\Sigma^+$ state, and $I_{abs}$ is the amount of 2,138A light absorbed by the NO.

$$I_{abs} = I_o (1 - \exp - [NO] \epsilon_{NO} l)$$

where $\epsilon_{NO}$ is the absorption coefficient of NO, $l$ the path length and $I_o$ is the incident intensity. At the low [NO] concentration range (NO = 500 ppm to 30 ppb)

$$I_{abs} = I_o \epsilon_{NO} l [NO]$$

and $$C_{NO} = S\phi I_o l \epsilon \epsilon_{NO} [NO] \cdot \Delta t_{int}$$

In the ratio photon counting technique, the product $I_o \cdot \Delta t_{int}$ is preset at a constant count. A dual counter-timer is used with the 2,138A light intensity measuring photomultiplier operating the time base of the counter. When the time base obtains the preset number of counts, it stops the fluorescence counting on the other counter. In this way the fluorescence counts are only a function of [NO], $$C_{NO} = [S'\phi l\epsilon_{NO}] [NO] \quad (1)$$

where $S' = S\Delta t_{int} I$. The first bracketed term is a constant determined by a calibration. In the range from 10 ppm to 300 ppm, $\phi = \phi'/[1 + a[NO]]$ where $\phi'$ and $a$ are constants.

It will be understood that the NO monitor of this invention is most sensitive when NO is being detected and monitored in a mixture of NO and nitrogen. It has been found that measurements in flow systems duplicate the precision and linearity observed in the static system (FIG. 5).

In automobile exhaust gas, concentrations of NO range from below about 30 ppm to about 3,000 ppm. "Outlook-Electric Vehicles, Revival of the Fifty-Year-Old Memory," *Environ. Sci. Technol.*, Vol. 1 (1967), at 194. In addition to nitrogen, exhaust gas contains about 10% of carbon dioxide, 13% of water, a maximum of 2% of hydrogen, a maximum of 5% of carbon monoxide, as well as hydrocarbons and other nitrogen oxides in the parts per million range. Although these gases quench the fluorescence of NO according to the equation $\phi / \phi$ (quencher) $= 1 + a[Q]$ wherein $\phi$ is the quantum efficiency of emission from the $A^2\Sigma^+$ state, $a$ is the quenching constant in torr$^{-1}$ and [Q] of the quencher in torr, it has been found that dilution of a sample containing carbon dioxide, water and the like with the order of 100 volumes of nitrogen prior to determination of NO fluorescence operated to minimize quenching of NO fluorescence.

Results of quenching studies are given in the following table:

| NO Fluorescence-Quenching Gas | Approximate Composition Range in % Vol. of Auto. Exhaust Gas | Quenching Constant a in Torr$^{-1}$ after Dilution of Sample by 100 to 1 with $N_2$ | % Fluctuation of $C_{NO}$ after Dilution by 100 to 1 with $N_2$ at 760 Torr and at 24°C |
|---|---|---|---|
| $H_2O$ | 13.0 to 13.2 | 0.90 | 47 to 47 |
| CO | 0.8 to 5.2 | 0.07±.01 | 0 to 3 |
| $CO_2$ | 9.5 to 10.2 | 0.90 | 39 to 41 |
| $O_2$ | ~0 | 0.50 | 0 |
| $C_2H_4$ | 0 to 0.2 | 0.10 | 0 to .15 |
| $C_3H_8$ | 0 to 0.2 | 0.01 | ~0 |
| $H_2$ | 0.2 to 1.7 | 0.005 | ~0 |
| Total Variation of the $C_{NO}$ | | | 0 to 5% |
| Total Variation without $CO_2$ | | | 0 to 3% |

Thus, in a sample of automobile exhaust gas diluted by a factor of 100 to 1 with nitrogen, the NO fluorescence signal is quenched to approximately 10% of its value in pure nitrogen. Variation in the CO and carbon dioxide concentrations can cause a total of about 6% variation in the NO fluorescence signal. If carbon dioxide is removed by scrubbing, this variation is of the order of about 3% and the signal increases by a factor of ~2. It will be appreciated that the monitor of this invention is usable for the detection and analysis of NO in automobile exhaust gases diluted with about 100 volumes of nitrogen to offset quenching of NO fluorescence because, even at orignal NO concentrations as low as 10 ppm, the NO concentration of the diluted exhaust stream is about 10 ppb. This concentration is within the sensitivity range of the fluorescence detector.

It will also be appreciated that sulfur dioxide normally present in automobile exhaust and stack gases absorbs ultraviolet radiation at 2,138 A, but that the fluorescence of sulfur dioxide at longer wavelengths does not interfere with monitoring of NO as long as a proper fluorescence transmission filter, particularly a filter transmitting from 2,200 to 3,200 A, is used between the fluorescence cell and the measuring means.

DETAILED DESCRIPTION OF THE INVENTION

As shown in FIG. 1, the NO pollution monitor of this invention comrpises a flow-type fluorescence cell 1 designed to minimize the scattering from the irradiation means or excitation light source 2, which is preferably a zinc glow discharge lamp emitting at 2,138 A. The cell is coated with black Teflon to provide a chemically inert and nonlight scattering cellwall. An interference filter 3 between the lamp and the cell window transmits only the 2,138 A line. The NO in the sample, activated by the irradiation at 2,138 A, emits fluorescence in the region from about 2,200 to about 3,200 A (the $\gamma$ band from the $A^2\epsilon^+$ state), which is measured by the means for measuring fluorescence intensity. The measuring means includes a filter 4, which passes the fluorescent bands and eliminates most of the incident 2,138 A radiation and a photomultiplier 5, which is placed at right angles to the direction of the excitation light. A second photomultiplier 6 measures the intensity of the 2,138 A light transmitted through the fluorescence cell.

The NO monitor shown in greater detail in FIGS. 2 and 3 includes a flow-type fluorescence cell 10 formed from four sections of tube 11–14 joined in cruciform fashion. Tubes 11 and 12 are closed with ultraviolet-transmitting windows 16 and 18. The remaining tubes 13 and 14 are closed by plates 17 and 19. The means for flowing a sample stream through the cell includes a gas inlet tube 20 and an outlet tube 22 secured in the openings provided in the centers of the top and bottom surfaces, respectively, of the fluorescence cell 10. Tubes 11–14, 20 and 22 and plates 17 and 19 are constructed from an NO-resistant material such as Monel or stainless steel.

A filter means which transmits wavelengths in the region below about 2,500 A and rejects longer wavelengths is represented by the window 16 which is normally transparent to ultraviolet in the region from about 2,100 to about 2,200 A and may be pure quartz, e.g., Suprasil.

A filter means which transmits wavelengths in the region from about 2,200 to about 3,200 A and rejects substantially all other wavelengths is represented by window 18. The effect of this filter is to reject scattered incident light, that is, light in the region between 2,100 and 2,300 A and above 3,200 A. A suitable material for this window is a Corning 9863 glass filter or its equivalent.

The remainder of the means for flowing the gas sample into the No monitor consists of inlet tube 20 connected by means of flexible inert tubing (not shown) to a smokestack, air monitoring station or other source of a gaseous mixture 24 containing NO. A vacuum pump 26 is connected to the outlet tube 22 whereby a sample stream 28 of the gaseous mixture is flowed vertically through the cell 10. The vacuum pump 26, if desired, may be replaced by a pressure pump (not shown) connected in the inlet line. In either case, the flow rate is adjusted so that the pressure in the cell 10 is approximately atmospheric pressure.

The means for irradiating the sample stream is a source of ultraviolet light 30 having one or more wavelengths in the region from about 2,100 to 2,300 A, aligned on the axis of tube 11 so as to project a beam through the sample stream 28. As a result, the NO in the sample stream fluoresces in the region from about 2,200 to 3,200 A. A portion 32 of this fluorescence, emerging at right angles to the incident beam, passes through filter window 18 (the filter blocks any scattered incident light) and impinges on the fluorescence measuring means, an ultraviolet-responsive photomultiplier tube (e.g. an EMI 6256S). A collimating structure such as a honeycomb (not shown) may be placed between window 18 and the photomultiplier tube 34. Tube 34 is supplied with direct current from a suitable supply 36. The photomultiplier output signal is amplified by a linear amplifier 38 and then measured, preferably by means of any suitable recording device or photon counter 40.

Figure 4:
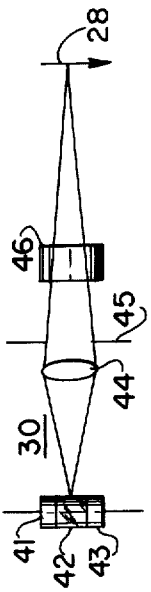
FIG. 4 is an elevational view, partly schematic, of a vapor lamp and filter system adapted for use in the monitor of FIG. 2.

It is contemplated that light source 30 may comprise an ultraviolet laser tunable in the region from 2,100 to 2,300 A when such devices are developed. In any event, the source 30 at present preferably comprises a zinc vapor lamp 42 (FIG. 3) preferably having a pair of electrodes 41 and 43 and operating on alternating current. Such a zinc vapor lamp has an intense resonance line at 2,138 A. As shown in FIG. 4, the radiation from the lamp 42 is collected by any suitable means such as a quartz lens 44 and focussed in the center of the sample stream 28. Rays diverging from the lens are blocked by a diaphragm 45 in order to reduce scattering of the incident light from the interior walls of the fluorescence cell. The converging beam is filtered at 46 to remove any spectral lines lying in the NO fluorescence region (2,200 to 3,200 A). Otherwise, these lines could be scattered in the cell and emerge through window 18. Filter 46 may consist of an interference filter which transmits the Zn 2,138 A line and blocks all other wavelengths.

FIG. 5 illustrates the response of the monitor of FIG. 1 to various concentrations of NO in the gaseous mixture measured in a static system. Using a zinc lamp, the concentration is linear from about 0.040 to 10 ppm of NO and sublinear to 300 ppm.

It will be obvious to those skilled in the art that the monitor illustrated in FIGS. 1–4 may be modified in various ways. For example, plate 17 opposite the input window 16 may be replaced by a similar window to permit monitoring of the incident beam. Thus, it is intended that the invention cover all modifications falling within the scope of the following claims.

What is claimed is:

1. A fluorescence method for determining relatively small concentrations of NO in a gaseous mixture, such as automotive exhaust gas, which contains relatively large concentrations of NO fluorescence quenching gases such as $CO_2$ and $H_2O$, comprising:

irradiating a gas consisting essentially of $N_2$ with ultraviolet in about the 2,100–2,300 A region and measuring the resultant background signal at about 2,200–3,200 A;

diluting said gaseous mixture with $N_2$ in a volume ratio of about 1:100;

irradiating said $N_2$-diluted gaseous mixture with ultraviolet in about said 2,100–2,300 A region and measuring the resultant background and NO fluorescence signal at about said 2,200–3,200 A; and subtracting said background signal from said background and NO fluorescence signal to obtain the desired NO fluorescence signal; said dilution of said gaseous mixture with $N_2$ serving to reduce fluctuations in said NO fluorescence signal due to fluctuations in the concentrations of said NO fluorescence quenching gases in said gaseous mixture.

* * * * *